United States Patent [19]

Parkinson et al.

[11] Patent Number: 5,173,905
[45] Date of Patent: Dec. 22, 1992

[54] PARITY AND ERROR CORRECTION CODING ON INTEGRATED CIRCUIT ADDRESSES

[75] Inventors: Ward D. Parkinson; Edward J. Heitzeberg, both of Boise, Id.

[73] Assignee: Micron Technology, Inc., Boise, Id.

[21] Appl. No.: 502,117

[22] Filed: Mar. 29, 1990

[51] Int. Cl.⁵ .......................................... H03M 13/00
[52] U.S. Cl. .................................... 371/40.1; 371/51.1
[58] Field of Search .................. 371/40.1, 51.1, 40.4, 371/55, 2.1, 21.6, 32

[56] References Cited

U.S. PATENT DOCUMENTS

| | | | |
|---|---|---|---|
| 3,270,318 | 8/1966 | Strawbridge | 371/51.1 |
| 3,914,741 | 11/1975 | Bonser et al. | 371/51.1 |
| 4,163,147 | 7/1979 | Scheuneman et al. | 235/312 |
| 4,335,459 | 6/1982 | Miller | 371/38 |
| 4,486,883 | 12/1984 | Kamai et al. | 371/51.1 |
| 4,493,081 | 1/1985 | Schmidt | 371/38 |
| 4,506,362 | 3/1985 | Morley | 371/13 |
| 4,528,666 | 7/1985 | Cline et al. | 371/51.1 |
| 4,528,667 | 7/1985 | Frühauf | 371/55 |
| 4,608,687 | 8/1986 | Dutton | 371/10 |
| 4,635,232 | 1/1987 | Iwahashi et al. | 365/200 |
| 4,639,895 | 1/1987 | Iwahashi et al. | 365/200 |
| 4,646,304 | 2/1987 | Fossati et al. | 371/40.4 |
| 4,689,792 | 8/1987 | Traynor | 371/38 |
| 4,706,249 | 10/1987 | Nakagawa et al. | 371/38 |
| 4,720,829 | 1/1988 | Fukasawa et al. | 371/2.1 |
| 4,726,021 | 2/1988 | Horiguchi et al. | 371/38 |
| 4,730,320 | 3/1988 | Hidaka et al. | 371/38 |
| 4,875,212 | 10/1989 | Hashimoto | 371/40.2 |
| 4,926,426 | 5/1990 | Scheuneman et al. | 371/40.1 |
| 4,955,023 | 9/1990 | Tanimoto | 371/40.1 |

OTHER PUBLICATIONS

Kalter et al., "A 50 ms 16 Mb DRAM with a 10 ms Data Rate," 1990 IEEE International Solid-State Conference, Feb. 16, 1990, pp. 232-233, 303.
Bruckert et al., "Designing Reliability into the VAX 8600 System," Digital Technical Journal, No. 1, Aug. 1985, pp. 71-77.

*Primary Examiner*—Robert W. Beausoliel
*Assistant Examiner*—Phung My Chung
*Attorney, Agent, or Firm*—Arnold, White & Durkee

[57] ABSTRACT

A more secure method for selecting and addressing individual integrated circuit chips and memory locations, registers or input/output ports within the chips includes supplying the chips with address information including address checking information, checking the address information actually received in the chip by using an address checking circuit in the integrated circuit, and inhibiting use of the address information in the chip when the address checking circuit indicates an erroneous address. By inhibiting the use of erroneous address information, state information stored in the integrated circuit is not lost. The integrated circuit sends a fault signal requesting retransmission of the address information for recovery from the address fault. Preferably the address checking information is an error detecting and correcting code for correcting single-bit errors and detecting double-bit errors. Then the integrated circuit functions properly with one defective address input.

23 Claims, 4 Drawing Sheets

0
PARITY AND ERROR CORRECTION CODING ON INTEGRATED CIRCUIT ADDRESSES

BACKGROUND OF THE INVENTION

1. Technical Field

The present invention relates generally to semiconductor integrated circuits, and in particular to such integrated circuits that receive a multi-bit address signal for chip selection or selection of a data register in the integrated circuit.

2. Description of the Background Art

Encoders and decoders employing error detecting and correcting codes (ECC) have been used in integrated circuit memories for correcting data errors. The data errors can be "hard" errors caused by defective memory cells, or they can be "soft" errors caused by alpha particles or by other temporary disturbance. In either case, data errors become more prevalent for high density memories, and therefore it is desirable to provide a degree of error correction coding that may compensate for the expected frequency of the errors. It is also known to signal when the error correcting codes are unable to correct the errors.

In a family of error correcting codes known as "Hamming" codes, a certain number of parity bits are added to each block of data bits to enable a desired number of errors in the block to be corrected. One or more additional parity bits can be added to detect additional errors that might not be corrected. For integrated circuit memories, for example, each block of data may include eight bits, and four parity bits may be added to correct any "single-bit error" occurring in the block. An additional parity bit may be added to detect any "double-bit error." By "single-bit error" it is meant that only one bit in the block is in error. In a similar fashion, a "double-bit error" refers to the occurrence of only two erroneous bits in the block.

Error correcting codes have also been used for protecting the transmission of data and memory addresses over busses in computer systems. But the checking and correcting of memory addresses on a bus is not sufficient to ensure that a memory will be properly addressed. In particular, address bit errors or control faults may occur between the error correction circuits and the memory cells, causing good data to be written to or read from the wrong location in memory. Some protection against this problem has been obtained by writing address checking information into the addressed memory location along with the data. Whenever data is read from memory, the address checking information is compared to the address that was used to read the memory. The address checking information may include the parity of the address used in the memory write operation, and to save memory storage space, this address parity information may be combined with data parity information and stored as part of an error correction code for correcting data errors.

The address checking information can detect a sufficient number of addressing faults to diagnose hardware errors in the address bus and control circuitry. But in general it is not possible to use the address checking information to recover from the addressing fault. Before the fault is detected, good data may have been written over and destroyed by the data written to the wrong memory location. Moreover, if new data is written to an incorrect memory location, the subsequent reading of the correct memory location will return old data, and this error will not be detected by comparison of the address checking information.

SUMMARY OF THE INVENTION

The primary object of the present invention is to provide an address checking and correcting mechanism that will better ensure that data will be written to a specified address instead of an erroneous address, and good data residing at an erroneous address will not be written over inadvertently and destroyed.

A related object of the present invention is to provide a more secure mechanism for selecting and addressing individual semiconductor integrated circuit chips that share a common address bus.

Briefly, in accordance with the most basic aspect of the present invention, the integrity of the state of an addressable integrated circuit is protected by supplying the integrated circuit with address information including address checking information. An address checking circuit in the integrated circuit checks the address information actually received, and inhibits the use of the address when the address checking circuit indicates that the address is erroneous.

In a preferred embodiment of the invention, the addressable integrated circuit is one of a plurality of addressable integrated circuits connected to a data processing unit via a multi-line bus. The bus conveys an address and an error correcting code (ECC) permitting the integrated circuit to correct single-bit errors and detect double-bit errors in the address. In the event of a double-bit error, the integrated circuit is inhibited from writing over data stored in the integrated circuit, and a fault or interrupt signal is sent back to the data processing unit to recover from the addressing fault by restarting the memory access operation, and the data processing unit is halted if the fault continues a predetermined number of times. Otherwise, the occurrence of the fault is logged for diagnostic and maintenance purposes.

The present invention also is applicable to the protection of addresses for selecting one of a number of integrated circuit chips on a bus as well as selecting a particular data storage location or input/output function associated with an individual chip. A chip is selected by comparing the corrected address to one or more predetermined addresses. To avoid the need for additional chip select inputs, a predetermined address is programmed in the chip. For protection from errors in the programmed address, an error correction code is stored together with the programmed address.

The address checking information can be conveyed to the chip without using additional chip leads by multiplexing the address checking information over the address bus or the data bus. In a system having a random access memory addressed by row and column addresses, for example, the address checking information can be multiplexed over the data bus during the time that the row address is sent over the address bus.

BRIEF DESCRIPTION OF THE DRAWINGS

Other objects and the advantages will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
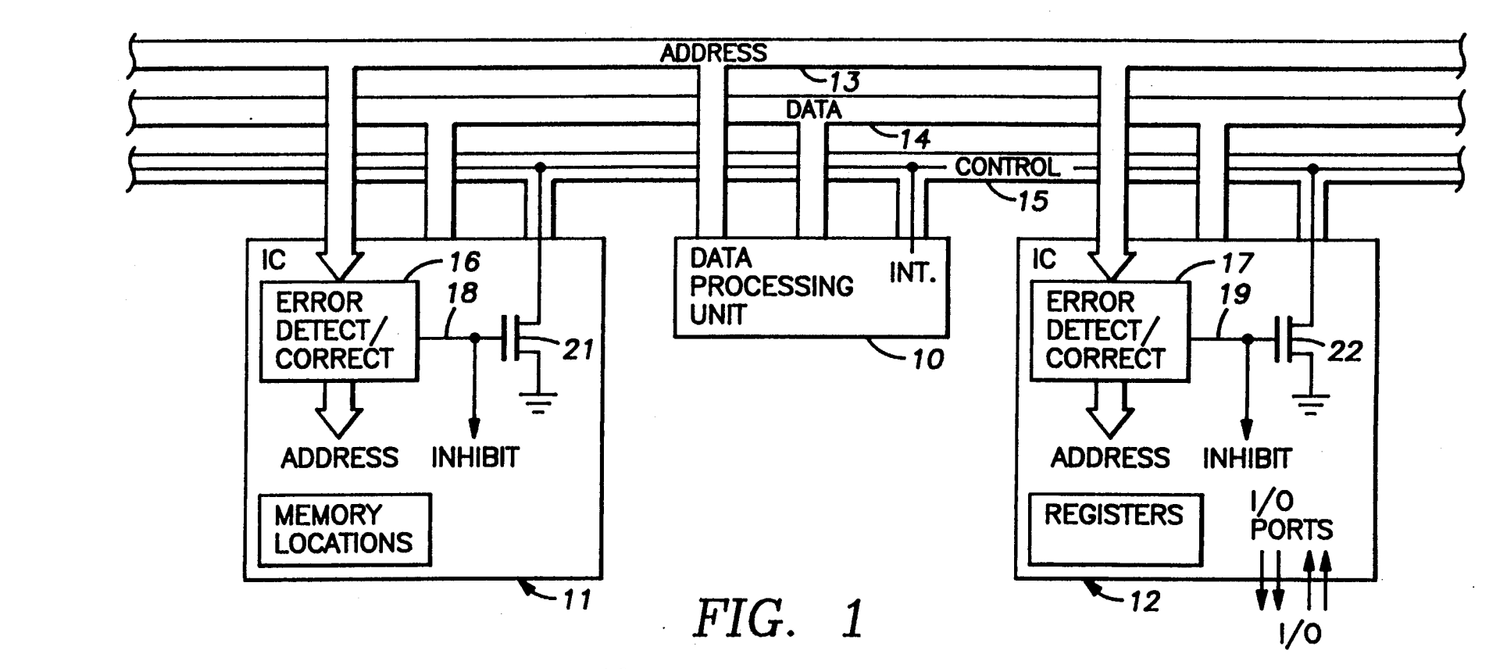
FIG. 1 is a block diagram showing a data processing unit connected to a number of addressable integrated circuits incorporating the present invention.

Turning now to the drawings, there is shown in FIG. 1 a block diagram of a data processing unit 10 connected to a number of addressable integrated circuits 11, 12 which incorporate the present invention. The data processing unit, for example, is a microprocessor, and the addressable integrated circuits include random access memories, programmable memories, read-only memories, peripheral interface adapters, asynchronous interface adapters, display controllers, disc drive controllers, programmable interrupt timers, and other multi-function integrated circuits.

As is conventional, the data processing unit 10 is connected to the integrated circuits 11 and 12 via an address bus 13, a data bus 14 and a control bus 15. To select a register or memory location in a particular one of the addressable integrated circuits, the data processing unit 10 transmits a corresponding address on the address bus 13.

In general, each of the addressable integrated circuits 11, 12 is preassigned a certain subset of the addresses which the data processing unit 10 can assert on the address bus 13. The addresses in each subset correspond to a number of memory locations, control registers or input/output registers or ports defined in the addressable integrated circuit. The data processing unit 10 may use the data bus 14 to read or write data to the addressed memory location, register or input/output port. To further specify the operation to be performed with respect to the addressed location, the data processing unit 10 asserts a signal, such as a read/write signal, on a line in the control bus 15.

It is important for information to be transmitted between the data processing unit 10 and the addressable integrated circuits 11, 12 without the occurrence of frequent errors. In large data processing systems, the transmission of information is often protected by parity signals on each of the address bus 13, the data bus 14, and the control bus 15. The parity signals, for example, are often generated before the signals are asserted on a multiline cable or back plane and are checked when the signals are received, for example, on a memory board, from the multi-line cable or back plane. This technique of parity checking is sufficient for protecting the system from errors generated when the information is transmitted over the multi-line cable or back plane, but fails to protect the system from errors which may occur between the parity checking circuits and the addressable integrated circuits.

Although it is generally unlikely for errors due to noise or interference to occur between the parity checking circuits and the addressable integrated circuits, errors can be introduced by faulty lead bonding or bent or broken pins on the addressable integrated circuits. The conventional approach to dealing with such problems has been to treat them as defects that should be prevented by proper design, inspection and testing prior to delivery of the data processing system to the user. In addition, in so-called high reliability computing systems, methods have been devised for detecting these kinds of problems as hardware defects when they affect the operation of the data processing system.

It is known to encode address information such as an address parity signal into an error correction code for the data and to store the error correction code for the data along with the data in an addressable memory location. When data is read from an addressed memory location, the error correcting code associated with the data may indicate that the data read from an addressed location should not have been stored in that location. In this manner, it is possible to detect the occurrence of improper addressing of the addressable integrated circuits. When such improper addressing is detected, the data processing system should be shut down for diagnosis and repair. The continued execution of a user program should not be permitted because the desired data may have been overwritten and destroyed by data which should have been written to a different address.

In accordance with an important aspect of the present invention, address errors are detected or corrected by circuitry inside the addressable integrated circuits 11, 12. This further prevents good data from being overwritten and destroyed by data being written to an incorrect address, and prevents data from being read from an improper address.

As shown in FIG. 1, each of the addressable integrated circuits 11, 12 includes error detection/correction circuits 16, 17 which compare a received address to address checking information and generate an inhibit signal on a line 18, 19 when the address checking information indicates the presence of an address error. The inhibit signal prevents the addressable integrated circuit from using the improper address to write data to an incorrect memory location or register. In addition, the inhibit signal is sent back to the data processing unit 10 as a fault or interrupt signal and is used by the data processing unit 10 to initiate the execution of a fault or interrupt routine for recovering from the address fault. In the fault or interrupt routine, the data processing unit restarts the memory access operation to clear the fault, and halts execution of the user program if the memory access operation is restarted a predetermined number of times without clearing the fault.

As shown in FIG. 1, all of the addressable integrated circuits 11, 12 share a common interrupt line 20 in the control bus 15. Each of the addressable integrated circuits 11, 12 has a N-channel field-effect transistor 21, 22 making a "wired-or" connection to the interrupt line 20. Therefore, the interrupt routine for recovering from an address fault can be initiated by any of the addressable integrated circuits 11, 12.

Preferably the error detecting and correcting circuits 16, 17 correct single-bit address errors without interrupting the data processing unit 10, and interrupt the data processing unit 10 when more than one bit in the address is erroneous. For this purpose, the error detecting and correcting circuits compare the received address to an error correction code (ECC) received from the address bus 13 along with the address bits.

Figure 2:
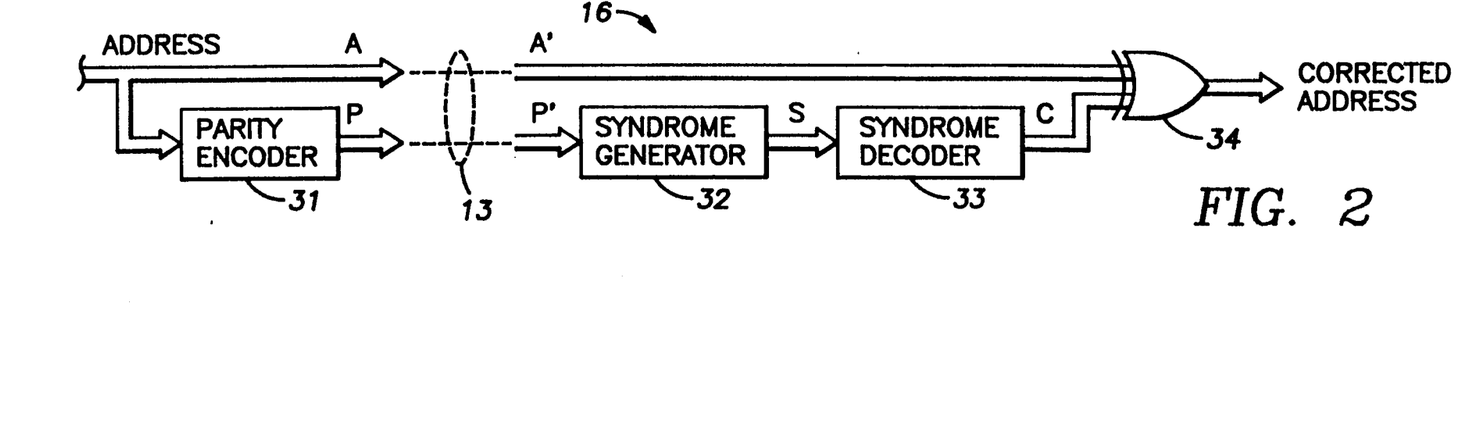
FIG. 2 is a block diagram illustrating the generation and use of an error correcting code.

Turning now to FIG. 2, there is shown a schematic diagram of the preferred encoding and error correcting circuits. The preferred error correction code is a Hamming code capable of correcting single-bit address errors and detecting double-bit address errors. As is well known, the Hamming code consists of a number of parity bits (P) that are generated by a parity encoder 31 from the address bits (A). Each parity bit (P) is generated by the "exclusive-or" of a respective predefined subset of the address bits.

In the addressable integrated circuits 11, 12, the error detection and correction circuits 16 include a syndrome generator 32 which, for each received parity bit (P'), generates a corresponding syndrome bit (S) by comparing the received parity bit to its respective subset of received address bits (A'). Thus each syndrome bit indicates whether a single-bit error has occurred in its corresponding received parity bit (P') or any one of the address bits A' corresponding to that parity bit. In addition, the parity bits are generated from the address bits so that a single-bit error in the received address bits A' will set at least two of the syndrome bits, and the logic states of the syndrome bits will indicate the erroneous received address bit. Therefore it is possible to use a syndrome decoder 33 to generate a correction mask (C) by decoding the syndrome bits such that the correction mask (C) has a logical one in the bit position corresponding to the erroneous received address bit. The single bit error in the received address bits is corrected by a bit-wise, exclusive-or 34 of the correction mask and the received address bits.

The operation of the error detecting and correcting circuits 16 will now be further illustrated by a specific example of an error correction code for protecting an eight-bit address. The syndrome decoder 33 must generate an eight-bit correction mask having bits $C_0$ to $C_7$ such that each of the correction bits is set only when at least two of the syndrome bits are set. Therefore, the logical equations for the syndrome decoder 33 can be determined from the first eight such possible combinations in binary order of the states of the syndrome bits, and further from the sequence of combinations it is apparent that four syndrome bits and hence four parity bits will be needed to correct single-bit errors in the eight address bits. By following this procedure, the first eight such binary combinations of the four syndrome bits are determined as follows:

$C_0 = \bar{S}_3 \bar{S}_2 S_1 S_0$ $C_1 = \bar{S}_3 S_2 \bar{S}_1 S_0$ $C_2 = \bar{S}_3 S_2 S_1 \bar{S}_0$ $C_3 = \bar{S}_3 S_2 S_1 S_0$ $C_4 = S_3 \bar{S}_2 \bar{S}_1 S_0$ $C_5 = S_3 \bar{S}_2 S_1 \bar{S}_0$ $C_6 = S_3 \bar{S}_2 S_1 S_0$ $C_7 = S_3 S_2 \bar{S}_1 \bar{S}_0$ Now that the equations for the syndrome decoder 33 have been determined, the equations for the syndrome generator 32 can be written by inspection upon considering that each of the four syndrome bits must be set by a single-bit error in its corresponding parity bit or any one of the address bits which is corrected when that syndrome bit is set. For an eight-bit address, the equations for the syndrome generator 32 corresponding to the equations above are as follows:

$S_0 = P_0' \oplus A_0' \oplus A_1' \oplus A_3' \oplus A_4' \oplus A_6'$ $S_1 = P_1' \oplus A_0' \oplus A_2' \oplus A_3' \oplus A_5' \oplus A_6'$ $S_2 = P_2' \oplus A_1' \oplus A_2' \oplus A_3' \oplus A_7$ $S_3 = P_3' \oplus A_4' \oplus A_5' \oplus A_6' \oplus A_7$ The equations for the parity encoder are similar to the equations for the syndrome generator:

$P_0 = A_0 \oplus A_1 \oplus A_3 \oplus A_4 \oplus A_6$ $P_1 = A_0 \oplus A_2 \oplus A_3 \oplus A_5 \oplus A_6$ $P_2 = A_1 \oplus A_2 \oplus A_3 \oplus A_7$ $P_3 = A_4 \oplus A_5 \oplus A_6 \oplus A_7$ The above procedure can be used to determine the number of required parity bits and the equations for encoding and decoding an address having a given number of bits in order to correct for single-bit errors.

An additional parity bit can be added for detecting double-bit errors. The additional parity bit simply indicates the parity of the other parity bits and the address bits on the address bus 13. When a double-bit error occurs, at least one of the syndrome bits will be set yet the parity of all of the bits on the address bus 13 will be correct. In the example of an eight-bit address, the additional equations for the syndrome decoder 33, the syndrome generator 32 and the parity encoder 31 are:

INHIBIT $= \bar{S}_4(S_3 + S_2 + S_1 + S_0)$ $S_4 = P_4' \oplus A_0' \oplus A_1' \oplus A_2' \oplus A_3' \oplus A_4' \oplus A_5' \oplus A_6' \oplus A_7' \oplus P_0' \oplus P_1' \oplus P_2' \oplus P_3'$ $P_4 = A_0 \oplus A_1 \oplus A_2 \oplus A_3 \oplus A_4 \oplus A_5 \oplus A_6 \oplus A_7 \oplus P_0 \oplus P_1 \oplus P_2 \oplus P_3$ The above equation for the fourth parity bit ($P_4$) can be simplified by substituting the equations for the other parity bits and eliminating terms by applying the identity $A_i \oplus A_i = 0$, and the identity $A_i \oplus 0 = A_i$, to conclude that:

$P_4 = A_0 \oplus A_1 \oplus A_2 \oplus A_4 \oplus A_5 \oplus A_7$

Whenever a double-bit error occurs in the address bits (A), the error correcting circuit of FIG. 2 cannot give a proper corrected address because it can correct at most one of the address bits. Therefore the addressable integrated circuit is inhibited from using the address when a double-bit error is detected, and the data processing unit 10 is signalled via the interrupt control line 20 to resend the address over the address bus. For more enhanced error protection, more complex error correcting codes could be used, for example, to correct double-bit errors and detect triple-bit errors. But these more complex codes require a greater number of parity bits and more complex encoding and error correcting logic.

Figure 3:
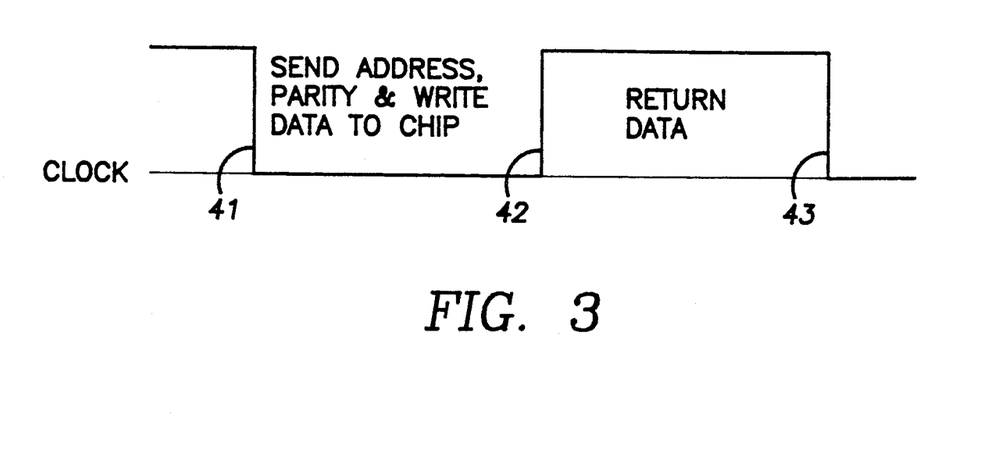
FIG. 3 is a timing diagram illustrating the use of a single clock for synchronizing the transmission of information between a data processing unit and an addressable integrated circuit.

Turning now to FIG. 3, there is shown a timing diagram of the operations performed in a data processing system of FIG. 1 which employs a single clock to synchronize the transmission of information over the address, data and control buses. The data processing unit sends a new address, parity signal and write data to the addressable integrated circuits when the clock signal has a negative-going transition 41. The clock has a subsequent positive-going transition 42 signalling that the addressable integrated circuits may assume that the received address, parity, and write data are stable.

During a read operation, the addressed integrated circuit returns data to the data processing unit via the data bus. The returned data must be stable when the clock has a following negative-going transition 43.

Figure 4:
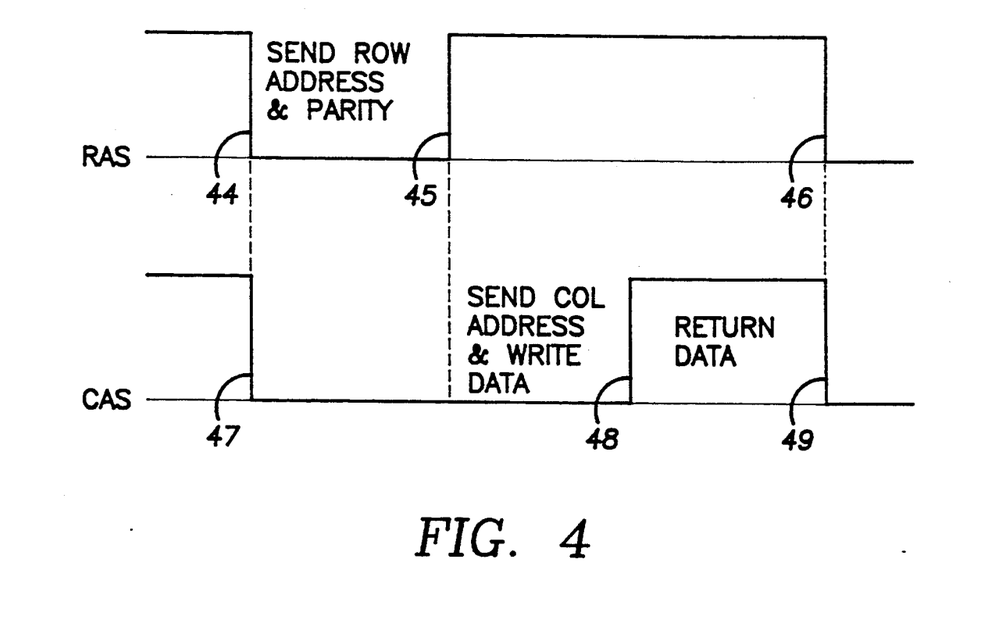
FIG. 4 is a timing diagram illustrating the use of a row address strobe and a column address strobe for synchronizing the exchange of information between a data processing unit and an addressable integrated circuit.

Turning to FIG. 4, there is shown a timing diagram of a somewhat more complex scheme wherein the transmission of information over the address, data and control busses is synchronized to a row address strobe (RAS) and a column address strobe (CAS). The scheme of FIG. 4 is used to double the number of address bits transmitted over the address bus 13 during a memory access cycle.

The row address strobe (RAS) is used to synchronize the transmission of a row address from the data processing unit to the addressable integrated circuits, and the column address strobe (CAS) is used to synchronize the transmission of a column address from the data processing unit. The data processing unit asserts the row address on the address bus upon the occurrence of a negative-going transition 44 of the row address strobe. When a following positive-going transition 45 occurs, the addressable integrated circuits may assume that the row address is stable. Typically, the row address signal is used to latch the row address when the row address is a logical high. Therefore, the row address remains latched until the following negative-going transition 46 of the row address strobe.

The column address strobe has negative-going transitions 47 and 49 synchronized to the negative-going transitions 44 and 46 of the row address strobe. Upon the occurrence of the positive-going transition 45 of the row address strobe, the data processing unit asserts a column address on the address bus. The addressable integrated circuit may assume that the received column address is stable upon the occurrence of a positive-going transition 48 in the column address strobe. During a read operation, the addressed integrated circuit will then return data when the column address strobe is a logical high. Typically, the addressable integrated circuits also use the column address strobe to latch the column address when the column address strobe is a logical high.

It may seem that the use of a row address strobe and a column address strobe will require fifty percent (50%) more time than the single clocking scheme of FIG. 1 to exchange information over the address, data and control buses. In practice, however, the scheme of FIG. 4 is typically used for addressing random access memory chips and, in this case, the column address can be transmitted during the time that the memory cells in the random access memory are being selected by the row address.

In accordance with an aspect of the present invention, the scheme of FIG. 4 does not use the data bus 14 for the transmission of data when the row address is transmitted over the address bus. During this time, address information such as the error correction code parity bits are transmitted over the data bus instead of the address bus. This technique will be further described below in connection with FIG. 6.

Figure 5:
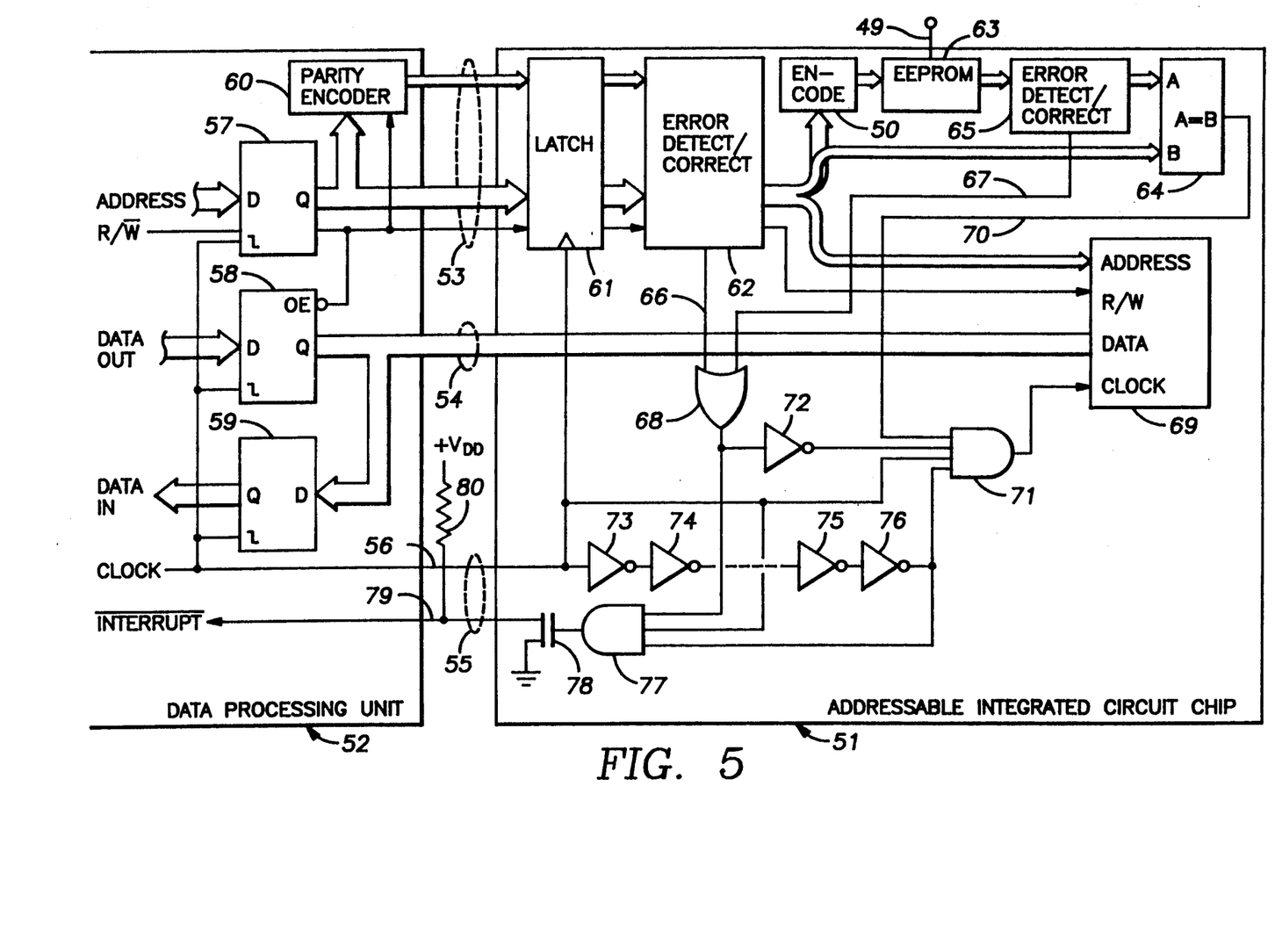
FIG. 5 is a schematic diagram of an addressable integrated circuit of the invention which is responsive to a single cock signal for synchronizing the exchange of information with a data processing unit.

Turning now to FIG. 5, there is shown a schematic diagram of an addressable integrated circuit chip 51 which is connected to a data processing unit 52 by an address bus 53, a data bus 54 and a control bus 55. The control bus 55 includes a single clock on a line 56 which synchronizes the transmission of information according to the scheme discussed above in connection with FIG. 3. For asserting the address and data on the address bus and data bus upon the occurrence of the negative-going transition of the clock, the data processing unit 52 includes an address register 57 and a data output register 58 which are responsive to the negative-going transition of the clock. To use the data bus 54 in a bidirectional fashion, the register 58 has a tristate output which is enabled by the read/write signal only during a write operation. In addition, data received from the bus 54 is clocked into a data input register 59 upon the occurrence of the negative-going transition in the clock.

As shown in FIG. 5, the read/write signal is treated as if it were an address bit. This is done because an erroneous read/write signal may have the same destructive effect as an erroneous address bit. In particular, if the read/write signal should indicate a read operation but instead is interpreted as indicating a write operation, the good data will be over-written with whatever appears on the data bus during the write operation. If the read/write signal should indicate a write operation but instead is interpreted as indicating a read operation, the new data will not be written over the old data, but instead will be lost and a subsequent read operation at the same address will return the old data.

To protect the integrity of the address, the address bits are fed to a parity encoder 60 which generates a sufficient number of parity bits to protect the address bus from single-bit errors and to enable the detection of double-bit errors.

In the addressable integrated circuit chip 51, the signals on the address bus 53 are received in a latch 61 that is latched in response to the clock signal from the clock line 56. The latch 61 ensures that error detection and correction circuits 62 will operate upon a stable address.

In accordance with another aspect of the present invention, the corrected address is used for selecting a particular one of a number of integrated circuit chips on a bus as well as selecting a particular data storage location, register or input/output function associated with an individual chip. Chip selection is protected by selecting a chip upon comparing the corrected address to a predetermined address or address range.

The comparison function can be performed by a programmed decoder, or by a programmable memory and an address comparator. The integrated circuit chip 51 as shown in FIG. 5 uses the latter technique and has an electrically erasable and programmable memory 63 (EEPROM) for storing address information indicating a predetermined most significant portion of the address, and an address comparator 64 which compares a predetermined number of most significant address bits to the address information stored in the EEPROM 63. The EEPROM is programmed by asserting a desired address on the address bus 53 and applying a signal to a program enable input 49.

Because the address comparison should be performed with the same high degree of reliability as the address transmission over the address bus 53, the address information in the EEPROM 63 includes an error correction code provided by an encoder 50, and the address information read from the EEPROM 63 is corrected by an error detecting and correcting circuit 65 before being compared in the comparator 64. The error detecting and correcting circuit 65 provides the same degree of protection as the error detecting and correcting circuit 62. In other words, it can correct single-bit errors and detect double-bit errors in the address information stored in the EEPROM 63.

Both of the error detecting and correcting circuits 62, 65 have respective output lines 66 and 67 which assert inhibit signals when double-bit errors are detected. These inhibit signals are combined in a NOR gate 68 which is used to inhibit addressable circuits 69 in the integrated circuit chip 51. The addressable circuits 69 receive a clock signal similar to the clock signal conveyed on the clock line 56 of the control bus 55. But the clock signal fed to the addressable circuits 69 has its positive-going transition delayed by a predetermined amount of time guaranteed to be greater than the delay time through the latch 61, the error detecting and correcting circuit 62, and the address comparator 64. The address comparator 64 has an output signal on a line 70 which is used to enable the addressable circuits 69 when the addressable integrated circuit chip 51 is selected. In the circuit shown in FIG. 5, this is done in an AND gate 71 which has an output providing the clock signal to the addressable circuits 69. The gate 71 also is inhibited by the inhibit signal asserted low by an inverter 72 connected to the output of the OR gate 68.

To generate the clock signal for the addressable circuit 69 from the clock signal on line 56 of the control bus 55, the gate 71 receives the clock signal on the line 56 as well as a delayed version delayed by a string of an even number of inverters 73, 74, 75, 76. A sufficient number of inverters should be used to provide the predetermined delay exceeding the total delay through the latch 61, error detecting and correcting circuits 62, and the address comparator 64.

In order to interrupt the data processing unit 52 when a double-bit error occurs, the inhibit signal from the OR gate 68 is fed to an AND gate 77 having an output enabling an NMOS transistor 78 which pulls down the interrupt line 79 of the control bus 55. Normally the interrupt line 79 is held high by a pull-up resistor 80 tied to +VDD. To exceed any delay through the error detecting and correcting circuits 62 and to assert the interrupt signal only when the clock on the line 56 is a logic high, the gate 77 is enabled by the clock signal on the line 56 as well as the delayed version of the clock from the inverter 76.

Figure 6:
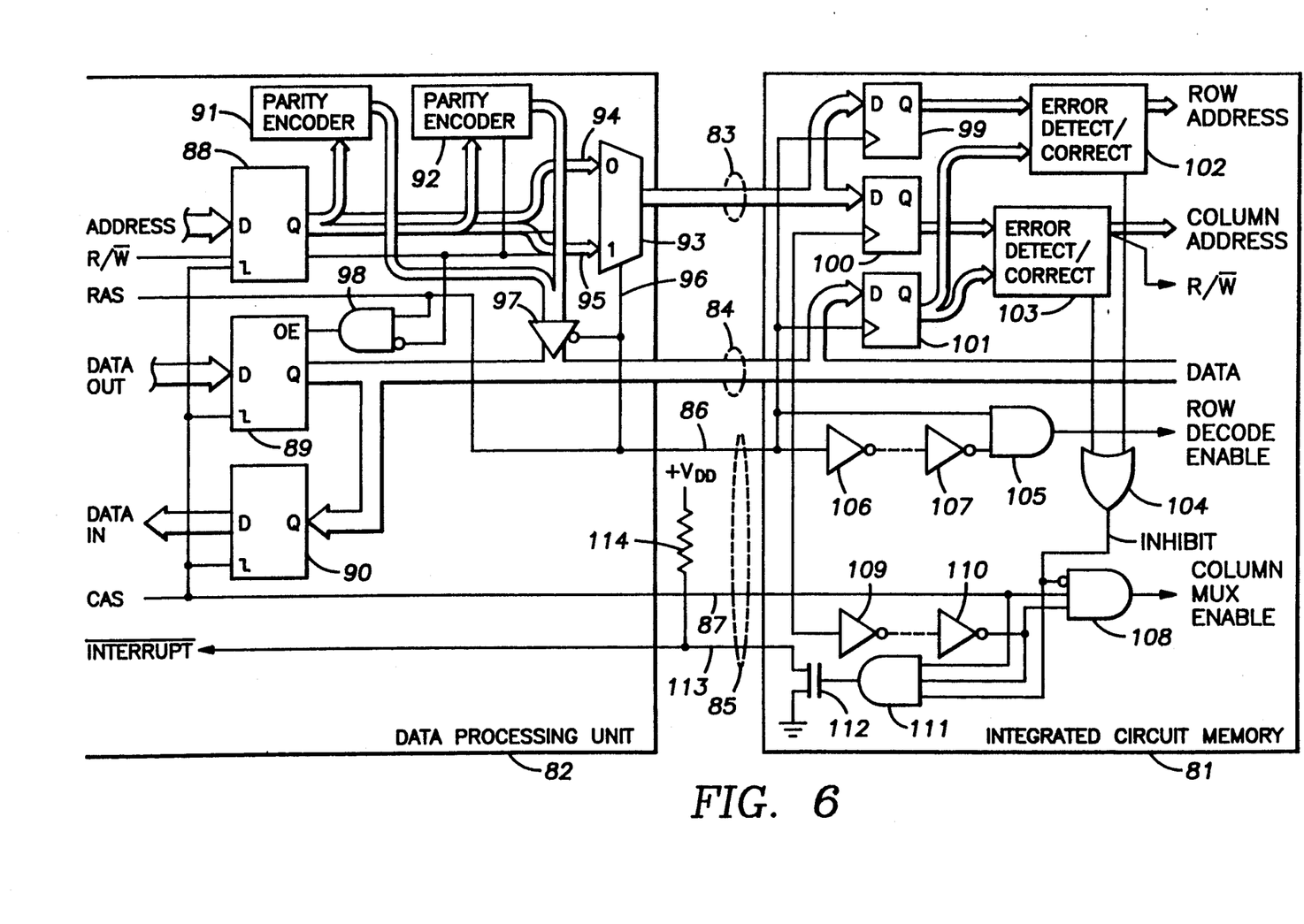
FIG. 6 is a schematic diagram of an addressable integrated circuit of the invention which is responsive to a row address strobe and a column address strobe for synchronizing the exchange of information with a data processing unit.

Turning now to FIG. 6, there is shown a schematic diagram of an integrated circuit memory 81 connected to a data processing unit 82 via an address bus 83, a data bus 84, and a control bus 85. To exchange data according to the scheme shown in FIG. 4, the control bus 85 in FIG. 6 conveys a row address strobe (RAS) on a line 86, and a column address strobe (CAS) on a line 87. To synchronize the transmission and reception of information over the address bus 83 and the data bus 84, the data processing unit 82 includes an address register 88, a data output register 89, and a data input register 90 which are clocked on the negative-going transition of the column address strobe.

So that the row address can be corrected before the column address to more quickly address the rows in the integrated circuit memory 81, the address is split into a row address and a column address, each of which has a separate error correcting code. The data processing unit 82 has a first parity encoder 91 for generating the error correction code for the row address, and a second parity encoder 92 for generating the error correction code for the column address. To multiplex the row address and the column address on the address bus 83, the data processing unit 82 includes a multiplexer 93 having a first data input 94 receiving the row address, and a second data input 95 receiving the column address. The multiplexer also has a select input 96 controlled by the row address strobe.

To transmit the error correction code on the data bus 84 when the row address strobe is a logic low, the parity bits from the parity encoders 91 and 92 are asserted on the data bus 84 by a tristate driver 97. To avoid contention between the tristate driver 97 and data output register 89, the data output register has its tristate output enabled by a gate 98 when the row address strobe is a logic high and the read/write signal indicates a write operation. In the integrated circuit memory, the row address and column address on the address bus 83 are demultiplexed into a row address latch 99 strobed by the row address strobe and a column address latch 100 strobed by the column address strobe. The error correction codes are received in a third latch 101 strobed by the row address strobe.

To correct any single-bit errors in each of the row address or the column address received by the latches 99, 100, the integrated circuit memory 81 includes error detecting and correcting circuits 102 and 103. To inhibit the integrated circuit memory when there is a double-bit error in the row address or the column address, the error detecting and correcting circuits 102 and 103 have outputs which are combined in an OR gate 104 to generate an inhibit signal.

The corrected row address from the error detecting and correcting circuits 102 are fed to a conventional row decoder (not shown) of a conventional memory cell array (not shown). The row decoder is enabled when the corrected row address is stable. To generate such a row decode enable signal, the leading edge of the row address strobe is delayed a predetermined amount of time exceeding the delay through the latch 99 and the error detecting and correcting circuits 102. The row decode enable signal is provided by a gate 105 combining the row address strobe with a delayed version of the row address strobe provided by a string of an even number of inverters 106, 107. The string of inverters includes a sufficient number to provide the predetermined delay. In a similar fashion, the corrected column address is fed to a conventional column decoder (not shown) which controls the multiplexing of the data bus 84 to the selected row of memory cells in the memory cell array (not shown). The direction of data flow during this multiplexing is controlled by the corrected read/write signal, and data transfer is enabled by a column multiplex enable signal when the corrected column address is stable. As shown in FIG. 6, the inhibit signal from the gate 104 is used to disable the column multiplex enable signal to inhibit the writing of data into the memory cell array (not shown). Also, the column multiplex enable signal is similar to the column address strobe except the positive-going transition of the column multiplex enable signal is delayed a predetermined amount of time exceeding the delay through the latch 100 and the error detecting and correcting circuit 103. For these reasons, the column multiplex enable signal is generated by an AND-gate 108 which is disabled by the inhibit signal from the OR-gate 104 and combines the column address strobe with a delayed version of the column address strobe that is generated by a string of an even number of inverters 109, 110.

To signal to the data processing unit that a double-bit error has been detected, the inhibit signal from the OR-gate 104 is combined with the column address strobe and the delayed column address strobe in an AND-gate 111 which enables an NMOS pull-down transistor connected to an interrupt line 113 of the control bus 85. The interrupt line 113 is normally pulled up to a logic high by a pull-up resistor 114 connected to +VDD. Upon receipt of the interrupt signal asserted low, the data processing unit executes an interrupt or fault handling routine for restarting the memory access operation. If the fault is not cleared after the memory access operation is restarted a predetermined number of times, execution by the data processing unit is halted.

In view of the above, a more secure mechanism for selecting and addressing individual integrated circuit chips and memory locations, registers or input/output ports within the chips is provided by supplying the chips with address information including address checking information, checking the address information actually received in the chip by using an address checking circuit in the integrated circuit, and inhibiting use of the address information in the chip when the address checking circuit indicates an erroneous address. By inhibiting the use of erroneous address information, state information stored in the integrated circuit is not lost, and the integrated circuit may send a fault signal requesting retransmission of the address information for recovery from the address fault. Preferably the address checking information is an error detecting and correcting code for correcting single-bit errors and detecting double-bit errors. Then the integrated circuit may function properly with one defective address input.

We claim:

1. A method of addressing a memory integrated circuit during a memory write operation, said memory integrated circuit having a plurality of addressable memory locations, each of said addressable memory locations having a respective one of a plurality of preassigned address, said method comprising the steps of:
   a) encoding one of said preassigned addresses according to an error detecting code to provide address information, said error detecting code permitting detection of error introduced into said address information during transmission of said address information;
   b) transmitting data and said address information from a second circuit to said memory integrated circuit;
   c) checking the address information actually received by said memory integrated circuit by using an address checking circuit in said memory integrated circuit to determine whether error was introduced into said address information during the transmission of the address information to said memory integrated circuit, and when said checking determines that error was introduced into said address information during said transmission of the address information to said memory integrated circuit,
       (i) inhibiting writing of said data to one of said addressable memory locations addressed by said address information actually received by said memory integrated circuit, and
       (ii) transmitting a fault signal from the memory integrated circuit to said second circuit to signal a failure of said memory write operation to be completed.

2. The method as claimed in claim 1, further comprising the step of said second circuit retransmitting said address information to said memory integrated circuit in response to said fault signal.

3. The method as claimed in claim 1, wherein said second circuit includes a data processing unit, and said method further comprises the step of interrupting said data processing unit to perform a predefined addressing fault handling routine in response to said fault signal.

4. A method of addressing a memory integrated circuit during a memory read operation, said memory integrated circuit having a plurality of addressable memory locations, each of said addressable memory locations having a respective one of a plurality of preassigned addresses, said method comprising the steps of:
   a) encoding one of said preassigned addresses according to an error detecting code to provide address information, said error detecting code permitting detection of error introduced into said address information during transmission of said address information;
   b) transmitting said address information form a second circuit to said memory integrated circuit;
   c) checking the address information actually received by said memory integrated circuit by using an address checking circuit in said memory integrated circuit to determine whether error was introduced into said address information during the transmission of the address information to said memory integrated circuit, and when said checking determines that error was introduced into said address information during said transmission of the address information to said memory integrated circuit, transmitting a fault signal from the memory integrated circuit to said second circuit to signal the occurrence of said error, and retransmitting said address information from said second circuit to said memory integrated circuit in response to said fault signal.

5. The method as claimed in claim 4, wherein said second circuit includes a data processing unit, and said method comprises the step of interrupting said data processing unit to perform a predefined addressing fault handling routine in response to said fault signal.

6. The method as claimed in claim 5, wherein said predefined addressing fault handling routine halts the data processing unit and logs the occurrence of the fault when the fault signal continues a predetermined number of times.

7. A method of addressing an integrated circuit during a write operation, said integrated circuit having a plurality of addressable registers, each of said addressable registers having a respective one of a plurality of preassigned address, said method comprising the steps of:

encoding one of said preassigned addresses according to an error detecting code to provide address information, said error detecting code permitting detection of error introduced into said address information during transmission of said address information;

b) transmitting data and said address information from a second circuit to said integrated circuit;

c) checking the address information actually received by said integrated circuit by using an address checking circuit in said integrated circuit to determine whether error was introduced into said address information during the transmission of the address information to said integrated circuit, and when said checking determines that error was introduced into said address information during said transmission of the address information to said integrated circuit, (i) inhibiting writing of said data to one of said registers addressed by said address information actually received by said integrated circuit, and (ii) transmitting a fault signal from the integrated circuit to said second circuit to signal a failure of said write operation to be completed.

8. The method as claimed in claim 7, further comprising the step of said second circuit retransmitting said address information to said integrated circuit in response to said fault signal.

9. The method as claimed in claim 7, wherein said second circuit includes a data processing unit, and said method comprises the step of interrupting said data processing unit to perform a predefined addressing fault handling routine in response to said fault signal.

10. A method of addressing a memory integrated circuit during a memory write operation, said memory integrated circuit having a plurality of addressable memory locations, each of said addressable memory locations having a respective one of a plurality of preassigned address, said method comprising the steps of:

a) encoding one of said preassigned addresses according to an error detecting and correcting code to provide address information, said error detecting and correcting code permitting correction of correctable error introduced into said address information during transmission of said address information, and permitting detection of uncorrectable error introduced into said address information during transmission of said address information;

b) transmitting data and said address information from a second circuit to said memory integrated circuit;

c) checking the address information actually received by said memory integrated circuit by using an address checking and correcting circuit in said memory integrated circuit to correct correctable error introduced into said address information during the transmission of the address information to said memory integrated circuit, and to determine whether uncorrectable error was introduced into said address information during the transmission of the address information to said memory integrated circuit, and when said checking determines that uncorrectable error was introduced into said address information during said transmission of the address information to said memory integrated circuit, (i) inhibiting writing of said data to one of said addressable memory locations addressed by said address information actually received by said memory integrated circuit, and (ii) transmitting a fault signal from said memory integrated circuit to said second circuit to signal a failure of said memory write operation to be completed.

11. The method as claimed in claim 10, further comprising the step of said second circuit retransmitting said address information to said memory integrated circuit in response to said fault signal.

12. The method as claimed in claim 10, wherein said second circuit includes a data processing unit, and said method comprises the step of interrupting said data processing unit to perform a predefined addressing fault handling routine in response to said fault signal.

13. The method as claimed in claim 10, further comprising the step of comparing a portion of the corrected address information to chip select information prestored in the memory integrated circuit to determine whether said corrected address addresses any of the addressable memory locations in said memory integrated circuit, and when said step of comparing indicates that said corrected address fails to address any of the addressable memory locations in said memory integrated circuit, inhibiting the writing of said data into any of said addressable memory locations.

14. The method as claimed in claim 10, wherein said step (b) of transmitting data and said address information includes transmitting said data over a data bus to said memory integrated circuit, transmitting a first portion of said address information over an address bus to said memory integrated circuit, and transmitting a second portion of said address information over said data bus to said memory integrated circuit.

15. The method as claimed in claim 14, wherein said step (b) of transmitting data and said address information includes transmitting a row address strobe and a column address strobe to said integrated circuit, transmitting row address information over said address bus and transmitting additional address information over said data bus during a first portion of a cycle of said row address strobe, and transmitting column address information over said address bus and said data over said data bus during a second portion of said cycle of said row address strobe.

16. A memory integrated circuit comprising terminals for connection to an address bus and a data bus, a plurality of addressable memory locations each having a respective one of a plurality of predetermined addresses, and means for transferring data between said data bus and each of said addressable memory locations when said address information received on said terminals indicates the predetermined address of said each of said addressable memory locations, wherein said memory integrated circuit further comprises:

address checking means, connected to a multiplicity of said terminals and responsive to error detection coding in said address information, for detecting error in said address information, fault signal transmitting means, connected to said address checking means and at least one of said terminals, for transmitting a fault signal from said memory integrated circuit when said address checking means detects error in said address information, and inhibiting means, connected to said address checking means, for inhibiting writing of said data from said terminals to any of said addressable memory locations when said address checking means detects error in said address information.

17. The memory integrated circuit as claimed in claim 16, wherein said means for transmitting a fault signal includes a pull-down transistor for sinking current from said one of said terminals.

18. A memory integrated circuit comprising terminals for connection to an address bus and a data bus, a plurality of addressable memory locations each having a respective one of a plurality of predetermined addresses, and means for transferring data between said data bus and each of said addressable memory locations when said address information received on said terminals indicates the predetermined address of said each of said addressable memory locations; wherein said memory integrated circuit further comprises:

address checking and correcting means, connected to a multiplicity of said terminals and responsive to error detecting and correcting coding in said address information, for correcting correctable errors in said address information to provide corrected address information, and for detecting uncorrectable errors in said address information, fault signal transmitting means, connected to said address checking and correcting means and at least one of said terminals, for transmitting a fault signal from said memory integrated circuit when said address checking means detects uncorrectable error in said address information, and inhibiting means, connected to said address checking and correcting means, for inhibiting writing of said data from said terminals to any of said addressable memory locations when said address checking and correcting means detects uncorrectable error in said address information.

19. The memory integrated circuit as claimed in claim 18, wherein said means for transmitting a fault signal includes a pull-down transistor for sinking current from said one of said terminals.

20. The memory integrated circuit as claimed in claim 18, further comprising comparing means, connected to said address checking and correcting means, for comparing a portion of the corrected address information to chip select information prestored in said memory integrated circuit to determine whether said corrected address information fails to indicate any of the addressable memory locations in said memory integrated circuit, and inhibiting writing of said data into any of the addressable memory locations when said corrected address fails to address any of said addressable memory locations.

21. The memory integrated circuit as claimed in claim 20, further comprising an electrically programmable memory providing said programmed address information.

22. The memory integrated circuit as claimed in claim 18, wherein said error checking and correcting means includes a syndrome generator and a syndrome decoder for indicating erroneous bits in said address information.

23. The memory integrated circuit as claimed in claim 18, further comprising de-multiplexing means connected to a plurality of said terminals for receiving a portion of said data and a portion of said address information from the same ones of said plurality of said terminals.

* * * * *